UNITED STATES PATENT OFFICE.

JOSEPH FLACHSLAENDER AND KARL PAUL GRÄLERT, OF ELBERFELD, AND MAX BUFF, OF VOHWINKEL, NEAR ELBERFELD, GERMANY, ASSIGNORS TO FARBENFABRIKEN VORM. FRIEDR. BAYER & CO., OF ELBERFELD, GERMANY, A CORPORATION OF GERMANY.

BROWN SULFUR COLORING-MATTERS.

1,081,602.  Specification of Letters Patent.  Patented Dec. 16, 1913.

No Drawing.  Application filed October 10, 1912. Serial No. 725,030.

*To all whom it may concern:*

Be it known that we, JOSEPH FLACHSLAENDER and KARL PAUL GRÄLERT, residing at Elberfeld, and MAX BUFF, residing at Vohwinkel, near Elberfeld, Germany, doctors of philosophy, chemists, citizens of the German Empire, have invented new and useful Improvements in New Brown Sulfur Coloring-Matters, of which the following is a specification.

Our invention relates to the manufacture and production of new and valuable brown sulfur colors which are obtained by treating with alkali polysulfids and copper or copper compounds phthaloperinone compounds having most probably the formula:

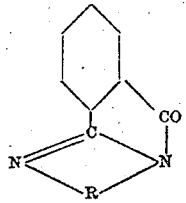

in which R stands for a naphthalene ring containing at least one nitro group.

The new dyes are after being dried and pulverized dark powders soluble in a solution of sodium sulfid generally with a yellowish-brown to red-brown coloration and soluble in concentrated sulfuric acid with a brown coloration. They dye cotton in bloomy catechu-brown shades distinguished by their fastness to light.

In order to illustrate the new process more fully the following example is given, the parts being by weight: 130 parts of crystallized sodium sulfid, 35 parts of sulfur, 10 parts of $CuSO_4$, 25 parts of dinitrophthaloperinone having most probably the following formula:

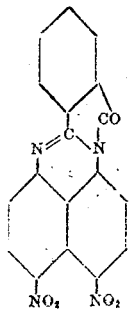

are heated during 10 hours to 200° C. The melt is powdered and then ready for use. The dyestuff is a dark powder soluble in a sodium sulfid solution with a reddish-brown coloration. It is soluble in concentrated sulfuric acid with a brown coloration and dyes cotton in pure catechu-brown shades fast to light.

The above mentioned quantities of sodium sulfid and of sulfur as well as the temperature and the duration of the reaction can be varied within wide limits.

Similar dyestuffs are obtained by using other of the above mentioned products, such as mononitrophthaloperinone etc.

We claim:

1. The herein described new sulfur dyes being sulfur-containing derivatives of phthaloperinone compounds having most probably the formula:

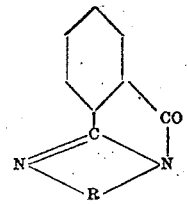

in which R stands for a naphthalene ring containing at least one nitro group, which dyes are after being dried and pulverized dark powders being soluble in a solution of sodium sulfid generally with a yellowish-brown to red-brown coloration; being soluble in concentrated sulfuric acid with a brown coloration; and dyeing unmordanted cotton bloomy catechu-brown shades fast to light, substantially as described.

2. The herein described new sulfur dye being a sulfur-containing derivative of dinitrophthaloperinone having most probably the formula:

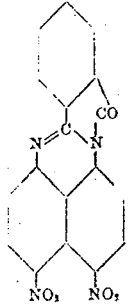

which is after being dried and pulverized a dark powder soluble in a sodium sulfid solution with a reddish-brown coloration and soluble in concentrated sulfuric acid with a brown coloration; dyeing unmordanted cotton in pure catechu-brown shades fast to light, substantially as described.

In testimony whereof we have hereunto set our hands in the presence of two subscribing witnesses.

JOSEPH FLACHSLAENDER. [L. S.]
  KARL PAUL GRÄLERT. [L. S.]
  MAX BUFF. [L. S.]

Witnesses:
 HELEN NUFER,
 ALBERT NUFER.